(12) United States Patent
Garrett, Sr. et al.

(10) Patent No.: US 6,181,238 B1
(45) Date of Patent: *Jan. 30, 2001

(54) PANIC BUTTON ALARM ACTUATOR

(76) Inventors: Charles N. Garrett, Sr., 2223 Jumpin Run Dr., Wilmington, NC (US) 28403; Brent W. Reed, 1545 Wade Hampton Blvd., Greenville, SC (US) 29609

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/037,496

(22) Filed: Mar. 10, 1998

Related U.S. Application Data

(60) Provisional application No. 60/040,279, filed on Mar. 11, 1997.

(51) Int. Cl.$^7$ .................................................. B60R 25/10
(52) U.S. Cl. ........................ 340/426; 340/430; 340/539; 340/825.69; 307/10.2
(58) Field of Search ..................... 340/426, 430, 340/825.69, 425.5, 528, 539; 307/10.2, 10.4

(56) References Cited

U.S. PATENT DOCUMENTS

| 5,515,285 | 5/1996 | Garrett, Sr. et al. . |
| 5,557,254 | 9/1996 | Johnson et al. . |
| 5,677,664 | * 10/1997 | Sawinski ............................ 340/426 |

* cited by examiner

*Primary Examiner*—Daryl Pope
(74) *Attorney, Agent, or Firm*—Dority & Manning, P.A.

(57) ABSTRACT

An improved panic button apparatus suitable for use in various vehicle monitoring systems. The apparatus includes a portable transmitter in wireless communication with a receiver located on-board the vehicle. The transmitter includes a manual actuator, typically a button, functioning to selectively input a panic command from a user. The transmitter sends a coded signal to the receiver, preferably in the form of a frequency-varying spread spectrum signal. The particular code of the transmitted signal is decoded by the receiver, which informs the vehicle monitoring and alarm system through an appropriate output signal.

8 Claims, 3 Drawing Sheets

PANIC BUTTON ALARM ACTUATOR

CROSS REFERENCE TO A RELATED APPLICATION

This application is based on a Provisional Application filed on Mar. 11, 1997 and having Ser. No. 60/040,279.

BACKGROUND OF THE INVENTION

The present invention relates generally to the art of vehicle monitoring and alarm systems. More particularly, the invention relates to improvements to a panic button actuator for use in such systems.

Various vehicle tracking systems have been developed to provide tracking of motor vehicles. One such system, described in U.S. Pat. No. 5,515,285 ("the '285 patent"), incorporated herein by reference, advantageously provides a dual state vehicle alarm system which may serve as a defensive measure to car jacking and auto theft related crimes. The system described in the '285 patent contains at least one panic button actuator to trigger the alarm system into either a first silent state or a second conspicuous state. In the first silent state, selected status information is transmitted to a remote monitoring site without alarm indicator means being conspicuously activated. In the second conspicuous state, the alarm indicator means are conspicuously activated.

The panic button actuator may be implemented as a portable device, such as a key chain ornament, carried by a user. It is especially desirable that the portable device have excellent immunity to normal kinds of RFI interference and operate with a reasonable range.

SUMMARY OF THE INVENTION

The present invention provides an improved panic button apparatus suitable for use in various vehicle monitoring systems. For example, in addition to alarm systems for private vehicles, the apparatus may be utilized with communication systems installed in law enforcement vehicles.

The apparatus includes a portable transmitter in wireless communication with a receiver located onboard the vehicle. The transmitter includes a manual actuator, typically a button, functioning to selectively input a panic command from a user. The transmitter sends a coded signal to the receiver, preferably in the form of a frequency-varying spread spectrum signal. The particular code of the transmitted signal is decoded by the receiver, which informs the vehicle monitoring and alarm system through an appropriate output signal.

Various objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
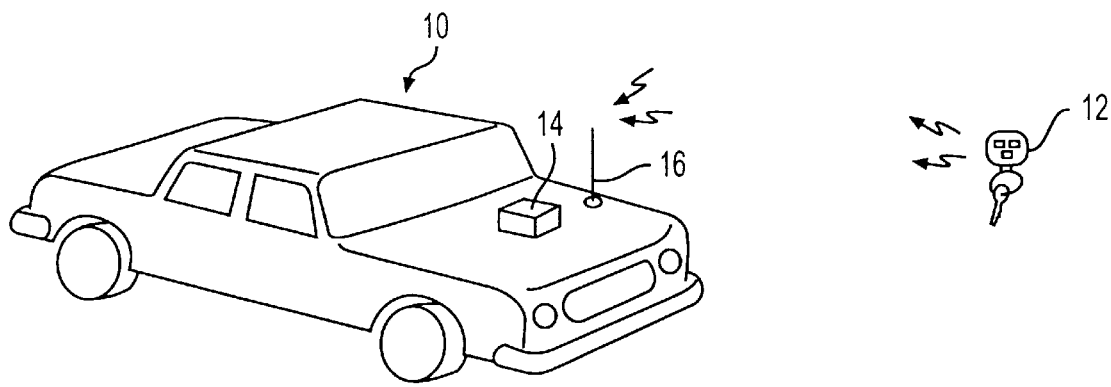
FIG. 1 diagrammatically illustrates components of an apparatus constructed in accordance with the present invention in operation.
Figure 2:
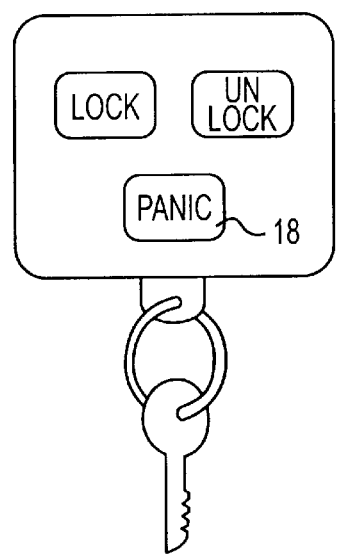
FIG. 2 is an enlarged elevation of a keychain ornament adapted to be utilized with the apparatus of FIG. 1.

Referring now to FIG. 1, an apparatus of the present invention includes a small transmitter 12 that may be conveniently carried by a user when away from the vehicle 10. In this case, the transmitter is incorporated into an ornament maintained on the user's keychain. As shown in FIG. 2, the ornament into which transmitter 12 is included may be of the type frequently supplied with new vehicles for remotely locking and unlocking the doors. While a keychain ornament is illustrated, it should be understood that the transmitter can be incorporated into various portable devices, such as a pager worn on the belt. Such an alternative may be particularly desirable if the transmitter will be carried by a law enforcement official.

A panic signal emitted by transmitter 12 is detected by a receiver 14 carried on-board the vehicle. In some exemplary embodiments, receiver 14 does not have a separate antenna, but advantageously utilizes the entertainment antenna 16 already present on the vehicle. Alternatively, a special antenna may be provided for receiver 14.

As shown in FIG. 2, the keychain ornament includes a "panic button" 18 which may be depressed by the user when a panic signal is to be sent. Often, the apparatus may be used with a two-state alarm system as described in the '285 patent. In such embodiments, one push of panic button 18 initiates a silent alarm state whereas two successive pushes will initiate a conspicuous alarm state.

As will now be described, the present invention utilizes a predetermined code of which both transmitter 12 and receiver 14 have knowledge in order to lessen the incidence of false activation. It is known that signal-to-noise ratio is inversely proportional to bandwidth. This fact implies that even with very low transmitter power, it is possible to achieve excellent signal-to-noise ratios in exchange for bandwidth. The initial uses of wide bandwidth spread spectrum technology have been in avionics and radar equipment where the purpose is to provide immunity to electronic countermeasures.

Spread spectrum technology as used in such radar applications involves modulation of the radar transmitter with a pseudo-random FM pattern. The local spread spectrum receiver has knowledge of the pseudo-random modulation pattern and uses this knowledge to detect the true radar echo with an extremely high degree of discrimination against attempts to jam or confuse the system.

Although such radar applications often use highly-complex pseudo-random modulation patterns, the present application can advantageously employ a small subset of more complex implementations to enhance resistance to noise and RFI signal interference. Typically, the transmitter may operate at a power level of 100 mw with a signal strength of luv per meter at a distance of 100 feet from the antenna in order to meet FCC radiation specifications for unlicensed operation.

The 49 MHZ band is one of several portions the radio spectrum specifically allocated for such commercial applications. A typical field strength sensitivity specified for a 20 dB signal-to-noise ratio for hand held VHF/UHF scanners is luv/per meter. A 20 dB signal-to-noise ratio for normal narrow band FM modulation is very adequate to provide good reception in the absence of accidental radio frequency interference. Immunity to commonly expected types of interference from nearby RF devices, such as garage door openers and mobile communications systems, is provided by a modulation scheme of the present invention.

Figure 3:
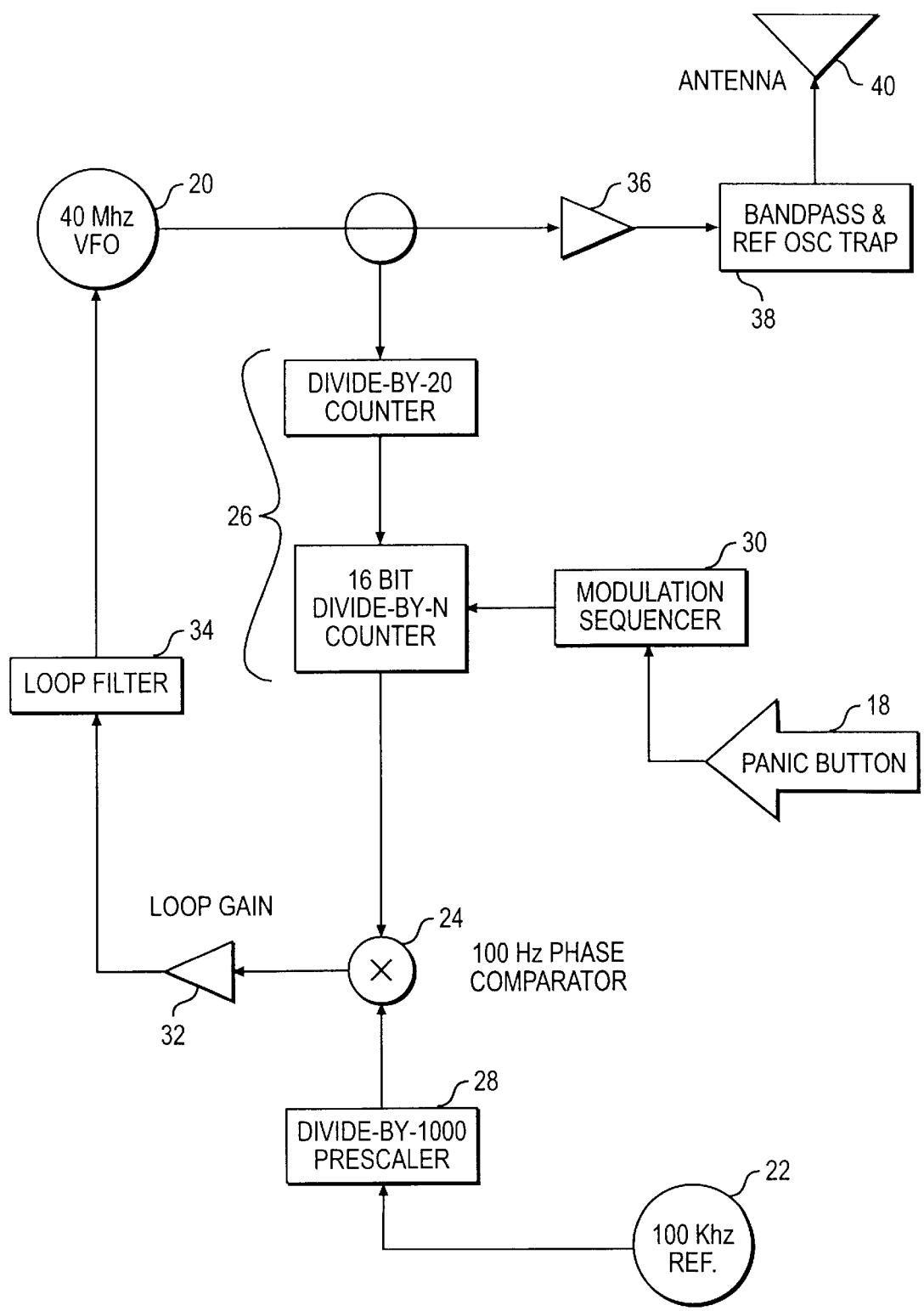
FIG. 3 is a diagrammatic representation of a preferred transmitter device of the panic button apparatus of the present invention.

Referring now to FIG. 3, transmitter 12 contains a frequency agile RF source constructed of a variable frequency oscillator 20 under the control of a precision crystal referenced phase locked loop (PLL). Preferably, the center carrier frequency of the output carrier is tightly controlled in both frequency and phase to a reference oscillator 22 which is typically much lower in frequency than the transmitter carrier.

Although a range of actual carrier frequencies may be utilized, some exemplary embodiments of the invention utilize a carrier of 40 MHZ. A varactor controlled variable frequency oscillator (VFO) may be provided to accept a baseband FM modulation input. In this case, modulation is accomplished by varying the reverse bias of a varactor diode which in turn changes the junction capacitance and changes the oscillator tank circuit tuning accordingly. Since the diode's capacitance is an approximately linear function of reverse junction bias, variation of the bias voltage provides a simple and reliable means of controlling the instantaneous phase of the carrier oscillator.

The control signal used to bias the frequency controlling varactor diode may be derived from a phase comparison circuit which operates at a frequency considerably lower than the carrier. There are several acceptable ways of designing this phase comparator. In general terms, either an analog mixer or a digital transition edge timing comparator are acceptable for this purpose. The frequency at which the phase comparison is accomplished determines the size steps in which the carrier frequency may be controlled. The lockup time is also affected to some degree because of implied limitations forced into the analog baseband passband of the varactor voltage input circuitry.

Another acceptable way of producing spread spectrum carrier modulation is known as direct frequency synthesis. This technique typically uses a ROM memory component to store a digitized version of a sine wave which is clocked out of the ROM into a D/A converter at a digitally controlled but variable rate.

The particular embodiment shown in the drawings utilizes the PLL method with an analog phase comparator 24. In this case, comparator 24 is a 100 Hz phase comparator which receives one input from a modulo divide-by-N counter chain 26. The other input is received from reference oscillator 22, as divided by a prescaler 28.

Counter chain 26 is used to divide the carrier oscillator frequency down to the frequency of the reference oscillator. In one implementation, this counter may be configured as a chain of programmable divide-by-10 or divide-by-16 lookahead ripple counters connected together by borrow and carry signals. As the programming inputs to a ripple counter are varied, the divide value N is changed in discrete integer steps from 1 to n, where n is determined by the number of counter stages.

To modulate the carrier, a unique repetitive digital data signal is applied to the counter programming inputs by a modulation sequencer 30, such as a 4-bit modulation sequencer. As shown, modulation sequencer 30 is activated when panic button 18 is depressed by the user. The result of each change to the counter inputs is a nearly instantaneous carrier frequency shift to a new and very stable frequency.

The output of comparator 24 is amplified at 32 by a predetermined gain and passed through a loop filter 34. The output of loop filter 30 then functions as the input to oscillator 20. The output of oscillator 20 is passed through a power amplifier 36 and a trap circuit 38 before being transmitted by local antenna 40.

Figure 4:
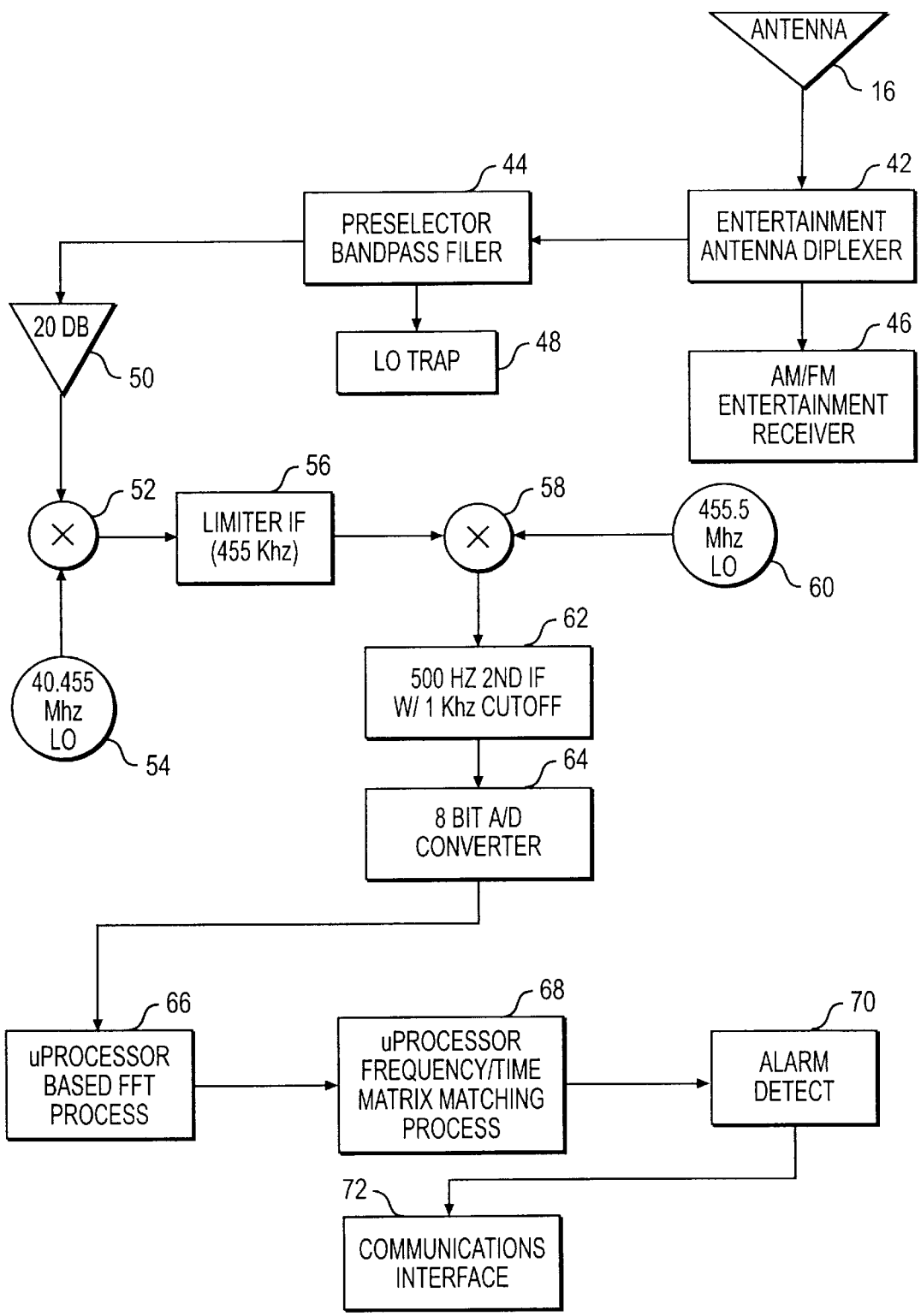
FIG. 4 is a diagrammatic representation of a preferred receiver device of the panic button actuator of the present invention.

Referring now to FIG. 4, low noise reception is achieved through common shared knowledge with transmitter 12 of the exact modulation frequencies and time sequential pattern of their appearance. It is much easier to detect a baseband signal of known frequency than one of unknown frequency, and this can be used to improve the range performance at low power levels. The time sequencing pattern provides interference immunity. Using a time sequence of carrier frequency shifts, it is possible to reduce the likelihood of a noise or interference induced trigger to a very acceptable level while optimizing operational range.

In exemplary embodiments, it is contemplated that the spacing between frequencies at each shift will be between 100 Hz and 1000 Hz. Assuming a 4-bit modulation sequencer, the transmitter will be able to transmit a total of sixteen different frequencies. Often, however, four such frequency shifts will be adequate for the purposes described herein. It will often be desirable for the pattern to continue for several seconds before a detect is registered. A modulation frequency, i.e., the rate at which the frequencies change, of about 10 cycles per second is believed to be acceptable for this purpose.

The panic signal is preferably separated from ordinary radio signals picked up by antenna 16 utilizing a diplexer 42. Diplexer 42 passes the panic signal frequencies to a preselector filter 44, while passing the entertainment radio signals to entertainment radio receiver 46. As shown, an LO trap 48 is provided, as well as a low noise amplifier 50. The output of amplifier is fed to a mixer 52, which also receives an input from a local oscillator 52 for heterodyne down conversion to an IF frequency. In the illustrated embodiment, the output of mixer 52 is passed through a limiter 56 to an additional mixer 58. Mixer 58 also receives an input from a second local oscillator 60. The output of mixer 58 is then passed through a second limiter 62 to achieve the analog signal that will be processed to determine whether the predetermined code is present.

A significant portion of the receiver design is the analog processing system which may be realized in a number of ways. The baseband output signal of the receiver may be analyzed in frequency domain using precision audio filters tuned to the various expected carrier frequency shifts. Alternatively, the output signal may be analyzed in time domain such as by using a fast Fourier Transform (FFT) algorithm to extract the frequency content of the receiver real time output. Although it may be more difficult to implement, FFT analysis is often preferable because it eliminates the necessity of precision analog filters. The FFT technique involves relatively complex computer programming but is capable of very reliable analysis of the baseband frequency power spectrum.

The particular embodiment illustrated in FIG. 4 utilizes FFT analysis to extract the panic signal. First, the analog signal is converted to digital at an appropriate A/D converter 64. As indicated at 66, the FFT of the digital signal produced in this manner is then produced. Next, as indicated at 68, the FFT is matched against the known code. The output produced at 68 is then passed to an alarm detection output interface 70. Interface 70 yields a first output if no match is noted, and a second output if the predetermined code has been detected.

The receiver further includes a suitable interface 72 for communicating with downstream equipment installed on-board the vehicle. In exemplary embodiments, such interface may preferably take the form of a RS 232 serial data stream, a RS 232 hardware handshake, or a printer parallel port connection. Software in the downstream equipment can recognize the signal from such interface and respond appropriately. For example, in the case of a system installed on a law enforcement vehicle, emergency "911" procedures can be initiated via police radio.

In some exemplary embodiments, the alarm apparatus may operate in a "normally on" mode where the receiver interprets transmission interruption as an emergency event. In other embodiments, particularly where it is desired to preserve battery strength for as long as possible, the alarm apparatus of the invention may operate in a "normally off" mode. In this case, an emergency event is initiated by positive transmission.

While preferred embodiments of the invention have been shown and described, modifications and variations may be made thereto by those of ordinary skill in the art without departing from the spirit and scope of the present invention. For example, although an FM arrangement has been described, it should be understood that AM pulse modulation using a pseudorandom code may also produce adequate noise immunity. In addition, it should be understood that various aspects of the disclosed embodiments may be interchanged both in whole or in part. Furthermore, those of ordinary skill in the art will appreciate that the foregoing description is by way of example only, and is not intended as limiting the broader aspects of the present invention.

What is claimed is:

1. An apparatus for communicating a panic command to a vehicle monitoring system, said apparatus comprising:

a portable transmitter including a manual actuator operable to input a panic command from a user, said transmitter comprising a frequency agile radiofrequency source constructed of a variable frequency oscillator generating an analog panic signal under the control of a phased lock loop, said transmitter responsively transmitting said analog panic signal in a predetermined coded format, said predetermined coded format being a frequency-varying spread spectrum signal; and a receiver located on-board the vehicle, said receiver operative to recognize said panic signal and responsively generate an output signal fed to the vehicle monitoring system.

2. An apparatus as set forth in claim 1, wherein said transmitter functions to transmit at a power level no greater than about 100 mw.

3. An apparatus as set forth in claim 1, wherein said frequency varying spread spectrum signal involves multiple frequency shifts separated by 100–1000 Hz.

4. An apparatus as set forth in claim 1, wherein said frequency varying spread spectrum signal involves no more than sixteen frequency shifts.

5. An apparatus as set forth in claim 4, wherein said frequency varying spread spectrum signal involves no more than four frequency shifts.

6. An apparatus as set forth in claim 1, wherein said receiver confirms presence of said predetermined code in said panic signal utilizing FFT processing techniques.

7. An apparatus as claimed in claim 1, wherein said phased lock loop comprises a precision crystal reference phased lock loop.

8. An apparatus for communicating a panic command to a vehicle monitoring system, said apparatus comprising:

a portable transmitter including a manual actuator operable to input a panic command from a user, said transmitter comprising a ROM memory capable of digitally controlling at a variable rate, a digital signal through a digital-to-analog converter, said transmitter responsively transmitting an analog panic signal in a predetermined coded format, said predetermined coded format being a frequency-varying spread spectrum signal; and a receiver located on-board the vehicle, said receiver operative to recognize said panic signal and responsively generate an output signal fed to the vehicle monitoring system.

\* \* \* \* \*